Figure 1:
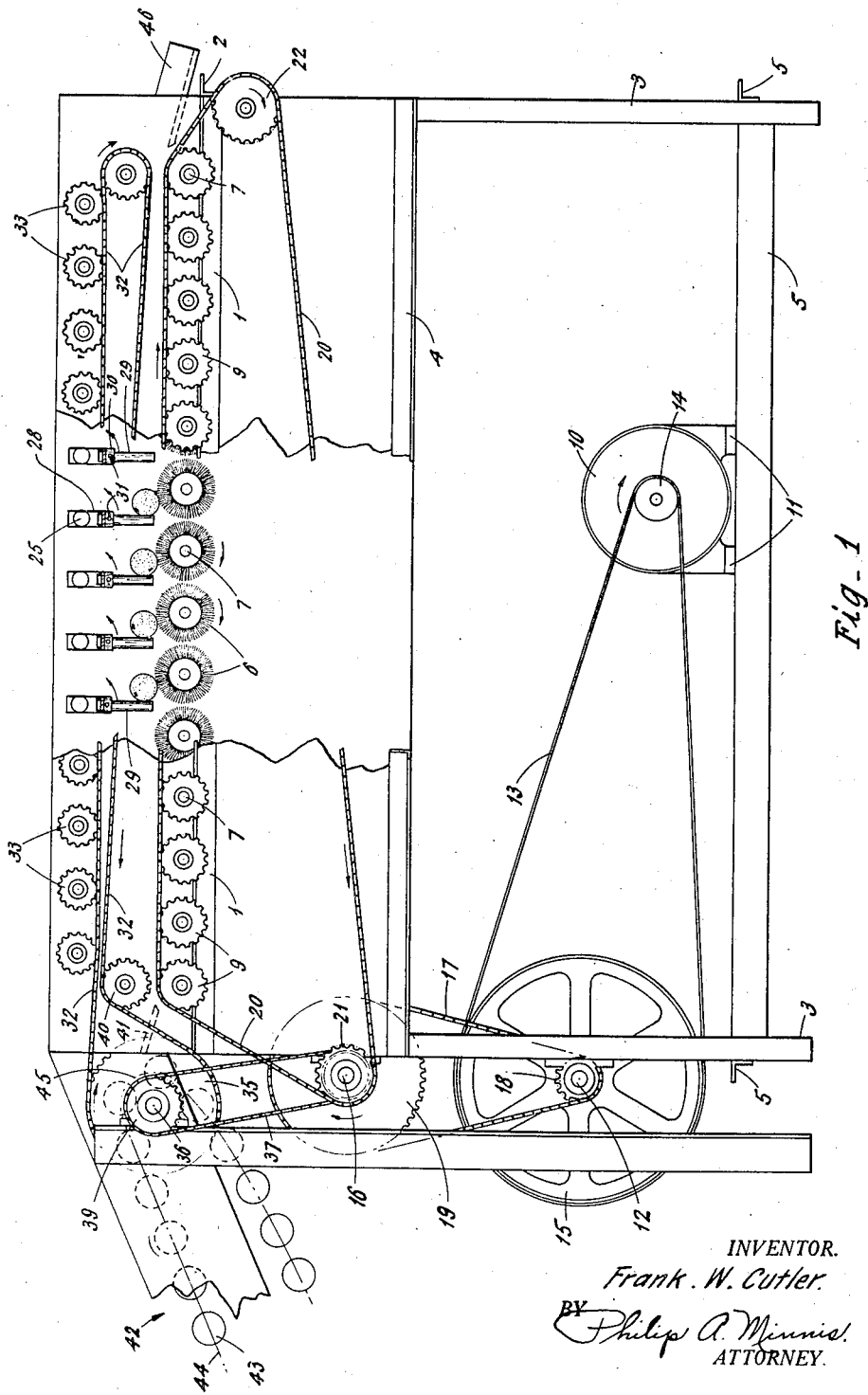

Feb. 9, 1937.  F. W. CUTLER  2,070,043
PROGRESSOR MECHANISM FOR FRUIT TREATING MACHINES
Filed March 10, 1934  2 Sheets-Sheet 1

INVENTOR.
Frank. W. Cutler.
BY
Philip A. Minnis.
ATTORNEY.

Feb. 9, 1937. F. W. CUTLER 2,070,043
PROGRESSOR MECHANISM FOR FRUIT TREATING MACHINES
Filed March 10, 1934 2 Sheets-Sheet 2

INVENTOR.
Frank. W. Cutler.
BY Philip A. Minnis
ATTORNEY.

Patented Feb. 9, 1937

2,070,043

UNITED STATES PATENT OFFICE 2,070,043

PROGRESSOR MECHANISM FOR FRUIT TREATING MACHINES

Frank W. Cutler, Portland, Oreg., assignor to Food Machinery Corporation, San Jose, Calif., a corporation of Delaware Application March 10, 1934, Serial No. 714,935

12 Claims. (Cl. 198—127)

This invention relates to an improved form of progressor mechanism applicable to fruit treating machines for progressing or advancing the fruit therethrough in such manner and at such speed as to insure uniformity of treatment for all the fruit for a selected period of time.

The progressor mechanism is advantageously employed in connection with fruit treating machines of the type in which the fruit to be treated is passed across a series of power driven cylindrical brushes, buffers, rollers or the like, arranged in side by side relation transversely of the flow of fruit so as to form a supporting and conveying runway for the fruit. In the operation of fruit treating machines of this character the fruit may be advanced over the runway either solely by the tractional effect of the rotating supporting elements, or by what is known as the displacement method in which, by reason of the particular proportions, arrangement and speed of the supporting elements, the fruit will not be advanced by the tractive effect of the supporting elements alone, but is advanced when the tractive effect is augmented by the urge of additional fruit being fed to the runway.

In the first of these methods the difficulty is presented that the rate of advance of the fruit cannot be regulated, nor can uniformity of treatment be secured by reason of the tendency of pieces of fruit of different sizes to be advanced at different speeds. In the displacement method it has been found that there is a tendency for the fruit passing along the sides of the runway to lag behind that passing down the center of the runway, particularly if the fruit be not fed uniformly across the width of the runway, and occasionally a piece of fruit of excessive size may tend to push or crowd its way over the runway in such manner as to retard the advance of other pieces, and under these circumstances uniformity of treatment is not secured, with the result that some of the fruit may be overtreated while others may be undertreated.

It has been found that the time of treatment may be closely regulated and uniformity of treatment insured by the use of a progressor mechanism for advancing the fruit in a uniform manner, one example of a suitable mechanism for the purpose being disclosed in my Patent No. 1,997,044.

The general object of the present invention is to provide a simplified and inexpensive but efficient progressor mechanism for fruit treating machines for regulating the advance of fruit therethrough so as to insure uniformity of treatment for a selected period of time.

Figure 2:
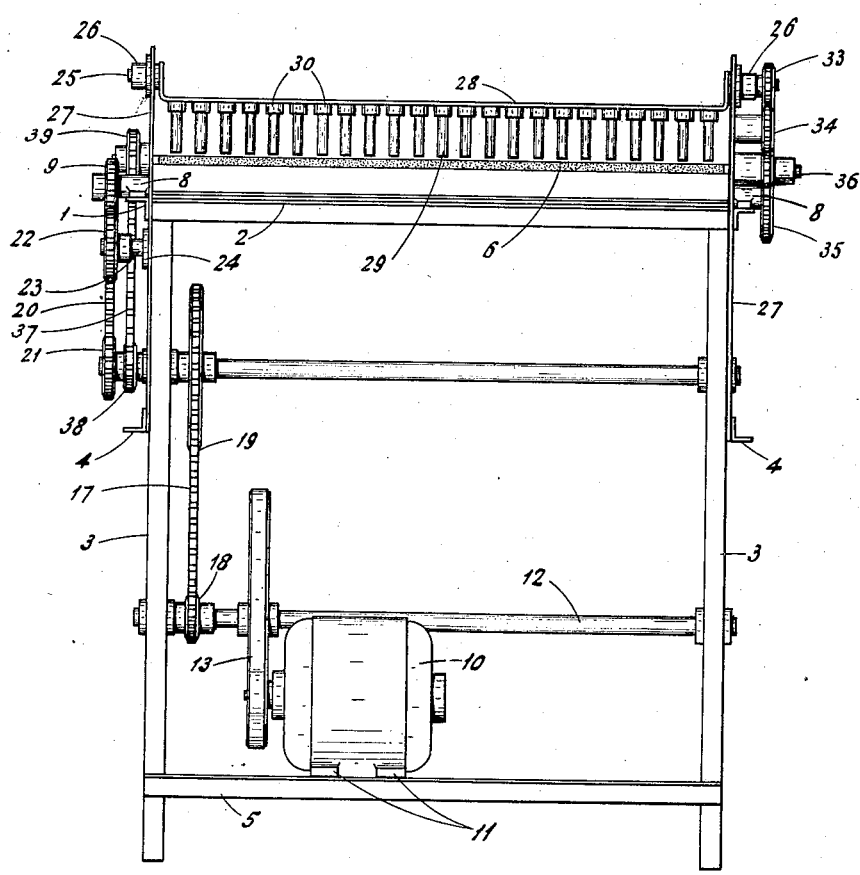

Other objects and advantages will become apparent from a detailed description of the illustrative embodiment of the invention disclosed in the accompanying drawings, in which:

Figure 1 is a side elevation of a fruit treating machine embodying the present invention, a portion thereof being broken away to better illustrate certain details of construction; and Figure 2 is an end elevation of the apparatus illustrated in Figure 1, as viewed from the right.

The numerals 1 and 2 represent side and end rails respectively which form a rectangular frame, supported by the vertical legs or standards 3 suitably braced as by the tie rails 4 and 5. A fruit treating runway or conveyer is made up of a series of cylindrical brushes 6 extending in parallel spaced relation transversely of the machine, and provided with supporting shafts 7 rotatably journalled near their outer ends in bearings 8 carried by the side rails 1. The brush supporting shafts 7 may be extended outwardly of their bearings to one side of the machine as shown for the reception of driving sprockets 9.

The brushes are all driven in a common direction as indicated by the arrows in Figure 1 by means of an electric motor 10 mounted upon cross members 11 supported transversely of the side tie rails 5. The motor drives a countershaft 12 by means of a belt 13 passing around motor pulley 14 and countershaft pulley 15, and a jack shaft 16 is in turn driven from the countershaft by chain 17 passing around sprockets 18 and 19 secured to the countershaft and jack shaft, respectively. A chain 20 is trained over the brush driving sprockets 9 and driven from a sprocket 21 secured to the jack shaft 16. A chain tightener sprocket 22 may be provided to maintain a proper tension in the chain 20, this tightening sprocket being carried by a stub axle 23 journalled in a bearing 24 which may be adjustably mounted on the adjacent corner standard 3.

In the illustrated embodiment, in order to provide for the regular and uniform advancement of the fruit across the brushes by the progressor mechanism about to be described, the brushes 6 used are of such proportions relative to the size of fruit being treated, and are so spaced and driven that the fruit may not normally be advanced thereacross by the tractive effect of the brushes alone, but may be advanced only by the application of additional force. By such arrangement the fruit deposited in the valleys between the brushes will remain there, being rotated and brushed between the faces of adjacent brushes, until urged forwardly by the application of force other than the tractive effect of the brushes, such as provided by the progressor mechanism now to be described.

The progressor mechanism for advancing the fruit in a regular and uniform manner across the treating brushes is mounted directly above the brushing runway and is made up of a series of progressor shafts 25 journaled near their outer ends in bearings 26 carried by the side walls 27 which extend along the sides of the machine and serve to partially enclose the same and to prevent the fruit from crowding endwise off the brushes. The shafts 25 extend immediately above and parallel to the valleys between the brushes and are provided with offset or crank like portions 28, to each of which is secured a row of resilient pusher or progressor fingers 29 of sufficient length to engage and advance fruit in orderly rows from valley to valley across the brushes upon rotation of the progressor shafts. The progressor fingers 29 are preferably formed of rubber or other resilient material of sufficient stiffness to advance the fruit, but soft enough to insure the partial yieldability desired for gentle handling of the fruit. It has been found in actual operation that occasionally pieces of fruit, particularly undersized pieces, are momentarily caught between the fingers and the faces of the brushes just ahead of the fruit with the result that if the fingers be unyielding such pieces of fruit are sometimes bruised or crushed, thus not only damaging the fruit but fouling the brushes as well. By forming the fingers of resilient material, however, the slight yielding of the fingers when a piece of fruit becomes caught as described is sufficient to allow the fruit to be released, and permit its proper advance without damage. The above described desirable and progressive advance of the fruit in orderly rows without tendency of increments thereof to be retarded or temporarily retained in any given valley, is further enhanced by arranging the progressor arms and shafts with respect to the brushes so that the arcuate or circular path defined by the outer ends of the progressor arms 29 is clear of or does not intersect the arcuate path of travel described by the peripheries of the rotating brushes or treating rolls 6. This relation is best seen in Fig. 1. The fingers may be removably secured to the progressor shafts by the provision of bushings 30, brazed or otherwise secured to the progressor shafts, into which the upper ends of the fingers are inserted and held in place as by cotter pins 31. This construction provides for the ready removal of any of the fingers for replacement purposes when they become worn.

The function of the crank like portions of the progressor shafts is to permit the outer ends of the pusher fingers to pass through the axis of rotation of the adjacent progressor shafts, thus making it possible to space the shafts sufficiently close to each other so that they may overlie the valleys between the brushes, and to arrange them at a sufficient elevation to clear the largest pieces of fruit while at the same time permitting the use of progressor fingers of adequate length to properly engage and advance the smallest pieces of fruit. The importance of the crank like construction will be apparent, as it will be seen that the several conditions referred to above could not be satisfied if the progressor shafts were straight, since if straight shafts were to be arranged at the elevation required to permit the passage of the largest pieces of fruit over the brushes the adjacent shafts would interfere with rotation of the progressor fingers, or, if the progressor fingers were shortened so as to clear adjacent shafts, their shortness would prevent them from properly engaging the smallest pieces of fruit.

The progressor shafts may be driven in timed relation to each other so as to rotate the progressor fingers in uniformly positioned relation, by means of a chain 32 trained beneath sprockets 33 secured to the outer ends of the progressor shafts to one side of the machine. The chain 32 is trained around a pair of sprockets 34 and 35, the latter being secured to the transverse conveyer shaft 36 which is driven from the jack shaft 16 by means of a chain 37 passing around sprockets 38 and 39 secured to the jack shaft and conveyer shaft respectively. A tightener sprocket 40 is provided to take up the slack in the chain 32.

The fruit to be treated is delivered over a ramp 41 to the brushing runway in successive rows by means of an endless cross roller conveyer 42 of conventional type, including a series of spaced rollers 43 transversely supported between side chains 44 which pass around and are driven by sprockets 45 secured to the transverse shaft 36.

The proper operation of the machine requires that the fruit be delivered to the brushes in such timed relation to the operation of the progressor mechanism that a single row of fruit is delivered by the endless conveyer to the brushes for each cycle of operation of the progressor fingers 29, and to this end the driving ratio between the sprockets 33 and 35 is such that during each revolution of the progressor shafts 25 the endless conveyer is moved forwardly just the proper distance to discharge a single row of fruit onto the brushes. The operative relation between the endless conveyer and the progressor mechanism may also be such that each row of fruit is delivered to the brushes just after the progressor fingers have started on their upward travel and left the valleys unobstructed.

The operation of the apparatus described may be described as follows:

The fruit to be treated is deposited upon the rollers 43 of the endless conveyer 42 and is conveyed toward the brushing runway in spaced rows resting between the conveyer cross rollers. During each complete cycle of the progressor fingers 29 the conveyer 42 is advanced just the proper distance to discharge a single row of fruit across the delivery ramp 41 and into the trough or valley between the initial pair of brushes, where it remains until the progressor fingers descend behind it and advance it to the next succeeding valley. As the progressor fingers advance the first row of fruit out of the valley between the first and second brushes, the endless conveyer discharges another row of fruit into the valley, and so on, the rows of fingers of the progressor mechanism operating in timed, uniformly positioned relation to advance the fruit over the brushes in uniformly separated rows in a step by step movement whereby all of the fruit is uniformly advanced and treated, and crowding of the fruit is effectually prevented. As may be seen, at each revolution of the progressor shafts the ends of the progressor fingers are enabled to pass through the axes of rotation of the adjacent progressor shafts without interference by reason of the crank like configuration of the shafts, thus making it possible to arrange the shafts at a sufficient elevation to clear the largest sized pieces of fruit while at the same time permitting the use of progressor fingers of sufficient length to properly engage and advance the smaller pieces without interference by adjacent progressor shafts. The fruit, after passing over the series of brushes, is finally discharged through the discharge chute 46 to any suitable point of delivery.

It is believed that the construction and principle of operation of the invention will now be fully understood by those skilled in the art, and what I claim as new and desire to protect by Letters Patent is:

1. In a fruit treating apparatus, a fruit treating runway comprising a series of substantially cylindrical supporting elements arranged transversely of the path of fruit passing thereover and in adjacent parallel relation whereby to form fruit supporting troughs therebetween, means for rotating said supporting elements, and means for advancing fruit along said runway in step by step movement including a plurality of progressor shafts rotatably journalled above and transversely of the runway, fruit progressing means carried by said progressor shafts and arranged to progress fruit from trough to trough across the supporting elements, each progressor shaft having an offset portion eccentric to its axis of rotation to permit the progressing means carried by adjacent progressor shafts to pass through its axis of rotation, and means for rotating said progressor shafts in timed relation to each other to cause said progressing means to engage and progress fruit along the runway.

2. In a fruit treating apparatus, a fruit treating runway comprising a series of substantially cylindrical supporting elements arranged transversely of the path of fruit passing thereover and in adjacent parallel relation whereby to form fruit supporting troughs therebetween, means for rotating said supporting elements, and means for advancing fruit along said runway in step by step movement including a plurality of progressor shafts rotatably journalled above and transversely of the runway, a row of resilient progressor fingers carried by each progressor shaft and arranged to progress fruit from trough to trough across the supporting elements, each progressor shaft having an offset portion eccentric to its axis of rotation to permit the progressor fingers carried by adjacent progressor shafts to pass through its axis of rotation, and means for rotating said progressor shafts in timed relation to each other to cause said progressor fingers to engage and progress fruit along the runway.

3. In a fruit treating apparatus, a fruit treating runway comprising a series of substantially cylindrical supporting elements arranged in adjacent parallel relation transversely of the path of fruit passing thereover, means for rotating said supporting elements, and means for advancing fruit along said runway in step by step movement including a plurality of progressor shafts rotatably journalled above and transversely of the runway and in staggered relation to said supporting elements, a row of resilient progressor fingers carried by said progressor shafts and engageable with fruit on the runway, each progressor shaft being formed with an offset crank-like portion to permit the progressor fingers carried by adjacent progressor shafts to pass through its axis of rotation, means for individually detachably securing said fingers to said crank-like portions, and means for rotating said progressor shafts in timed relation to each other to cause the progressor fingers to engage and advance fruit along the runway.

4. In a fruit treating apparatus, a conveyer comprising a series of substantially cylindrical supporting elements arranged transversely of the path of fruit passing thereover and in adjacent parallel relation whereby to form fruit supporting troughs therebetween, means for rotating said supporting elements in a common direction, the proportions and arrangement of said supporting elements being such that they are normally incapable of advancing the fruit thereacross by their tractive effort alone, and means for advancing fruit over said conveyer in step by step movement including a plurality of progressor shafts rotatably journalled above and transversely of the conveyer, fruit progressing means carried by said progressor shafts and arranged to progress fruit from trough to trough across the supporting elements, each progressor shaft having an offset portion eccentric to its axis of rotation to permit the progressing means carried by adjacent progressor shafts to pass through its axis of rotation, and means for rotating said progressor shafts in timed relation to each other to cause said progressing means to engage and progress fruit over the conveyer.

5. In a fruit treating apparatus, a conveyer comprising a series of substantially cylindrical supporting elements arranged transversely of the path of fruit passing thereover and in adjacent parallel relation whereby to form fruit supporting troughs therebetween, means for rotating said supporting elements in a common direction, the proportions and arrangement of said supporting elements being such that they are normally incapable of advancing the fruit thereacross by their tractive effort alone, and means for advancing fruit over said conveyer in step by step movement including a plurality of progressor shafts rotatably journalled above and transversely of the conveyer, a row of resilient progressor fingers carried by each progressor shaft and arranged to progress fruit from trough to trough across the supporting elements, each progressor shaft having an offset portion eccentric to its axis of rotation to permit the progressor fingers carried by adjacent progressor shafts to pass through its axis of rotation, and means for rotating said progressor shafts in timed relation to each other to cause said progressor fingers to engage and progress fruit along the runway.

6. In a fruit treating apparatus, a conveyer comprising a series of substantially cylindrical supporting elements arranged in adjacent parallel relation transversely of the path of fruit passing thereover, means for rotating said supporting elements in a common direction, the proportions and arrangement of said supporting elements being such that they are normally incapable of advancing the fruit thereacross by their tractive effort alone, and means for advancing fruit over the conveyer in a step by step movement including a plurality of progressor shafts rotatably journalled above and transversely of the conveyer and in staggered relation to said supporting elements, a row of resilient progressor fingers carried said progressor shafts and engageable with fruit on the runway, each progressor shaft being formed with an offset crank-like portion to permit the progressor fingers carried by adjacent progressor shafts to pass through its axis of rotation, means for individually detachably securing said fingers to said crank-like portions, and means for rotating said progressor shafts in timed relation to each other to cause the progressor fingers to engage and advance fruit along the runway.

7. In a fruit treating apparatus, a fruit treating runway comprising a plurality of treating rolls arranged in adjacent parallel relation transversely of the path of fruit passing thereover to provide valleys therebetween wherein fruit may be supported to project above the tops of the rolls, means for rotating said rolls, means for advancing fruit in successive rows from valley to valley along said runway including a plurality of progressor shafts rotatably journalled above adjacent valleys and transversely of the runway, a row of progressor fingers carried by said shafts for operation thereby to sweep across said valleys and engage and propel fruit from valley to valley along the runway, said progressor fingers being of such length that the diameters of the circular paths described by their outer ends are greater than the diameters of the rolls whereby to reduce downward pressure of said fingers against the fruit as said fingers are moved into propelling engagement therewith, means for driving said progressor shafts in timed relation whereby their associated progressor fingers are actuated to simultaneously advance the several rows of fruit engaged thereby, and means for feeding successive rows of fruit to said runway in timed relation to the operation of said progressing means.

8. In a fruit treating apparatus, a fruit treating runway comprising a plurality of treating rolls arranged in adjacent parallel relation to provide fruit supporting valleys therebetween, means for rotating said rolls, means for advancing fruit in successive rows from valley to valley across said rolls including a plurality of rotary progressor shafts mounted in fixed positions above and longitudinally of said valleys, fruit progressing means carried by said shafts for operation thereby to sweep across said valleys and engage and propel fruit therefrom in orderly rows, the arcuate path defined by the outer ends of the progressor means being clear of and not intersecting the arcuate path of travel described by the peripheries of said treating rolls whereby to enhance the orderly advance of the fruit, means for driving said progressor shafts in timed relation whereby their associated progressing means are actuated to simultaneously advance from each valley the several rows of fruit engaged thereby, and means for feeding successive rows of fruit to said runway in timed relation to the operation of said progressing means.

9. In a fruit treating apparatus, a fruit treating runway comprising a plurality of treating rolls arranged in adjacent parallel relation to provide fruit supporting valleys therebetween, means for rotating said rolls, means for advancing fruit in successive rows from valley to valley across said rolls including a plurality of rotary progressor shafts mounted in fixed positions above and longitudinally of said valleys, fruit progressing means carried by said shafts for operation thereby to sweep across said valleys and engage and propel rows of fruit therefrom, the paths followed by adjacent progressing means being in overlapping relation, means for driving said progressor shafts in timed relation whereby their associated progressing means are actuated to simultaneously advance the several rows of fruit engaged thereby, and means for feeding successive rows of fruit to said runway in timed relation to the operation of said progressing means.

10. In a fruit treating apparatus, the combination of fruit treating runway comprising a plurality of treating rolls arranged in adjacent parallel relation to provide fruit supporting valleys therebetween, means for feeding successive rows of fruit to a said valley of said runway, means for rotating said rolls, means for advancing fruit in successive rows from valley to valley across said rolls and including a plurality of rotary progressor shafts mounted in fixed positions above and longitudinally of said valleys, fruit progressing means projecting radially from each of said shafts for operation thereby to sweep across said valleys and engage and propel fruit therefrom in orderly rows at each revolution of said progressor shafts, means for driving said progressor shafts in timed relation whereby their respective progressing means are actuated to simultaneously advance from each valley the several rows of fruit contained therein, said fruit feeding means being synchronized with the rotation of said progressor shafts whereby to deliver a single row of fruit to be treated to a said valley for each complete revolution of said progressor shafts.

11. In a fruit treating apparatus, a fruit treating runway comprising a plurality of treating rolls arranged in adjacent parallel relation transversely of the path of fruit passing thereover to provide valleys therebetween wherein fruit may be supported to project above the tops of the rolls, means for rotating said rolls, means for advancing fruit in successive rows from valley to valley along said runway including a plurality of progressor shafts rotatably journalled above adjacent valleys and transversely of the runway, a row of progressor fingers carried by said shafts for operation thereby to sweep across said valleys and engage and propel fruit from valley to valley along the runway, said progressor fingers being of such length that the diameters of the circular paths described by their outer ends are greater than the diameters of the rolls whereby to reduce downward pressure of said fingers against the fruit as said fingers are moved into propelling engagement therewith, and means for driving said progressor shafts in timed relation whereby their associated progressor fingers are actuated to simultaneously advance the several rows of fruit engaged thereby.

12. In a fruit treating apparatus, a fruit treating runway comprising a plurality of treating rolls arranged in adjacent parallel relation to provide fruit supporting valleys therebetween, means for rotating said rolls, means for advancing fruit in successive rows from valley to valley across said rolls including a plurality of rotary progressor shafts mounted in fixed positions above and longitudinally of said valleys, fruit progressing means carried by said shafts for operation thereby to sweep across said valleys and engage and propel fruit therefrom in orderly rows, the arcuate path defined by the outer ends of the progressor means being clear of and not intersecting the arcuate path of travel described by the peripheries of said treating rolls whereby to enhance the orderly advance of the fruit, and means for driving said progressor shafts in timed relation whereby their associated progressing means are actuated to simultaneously advance from each valley the several rows of fruit engaged thereby.

FRANK W. CUTLER.